Figures 1, 2:
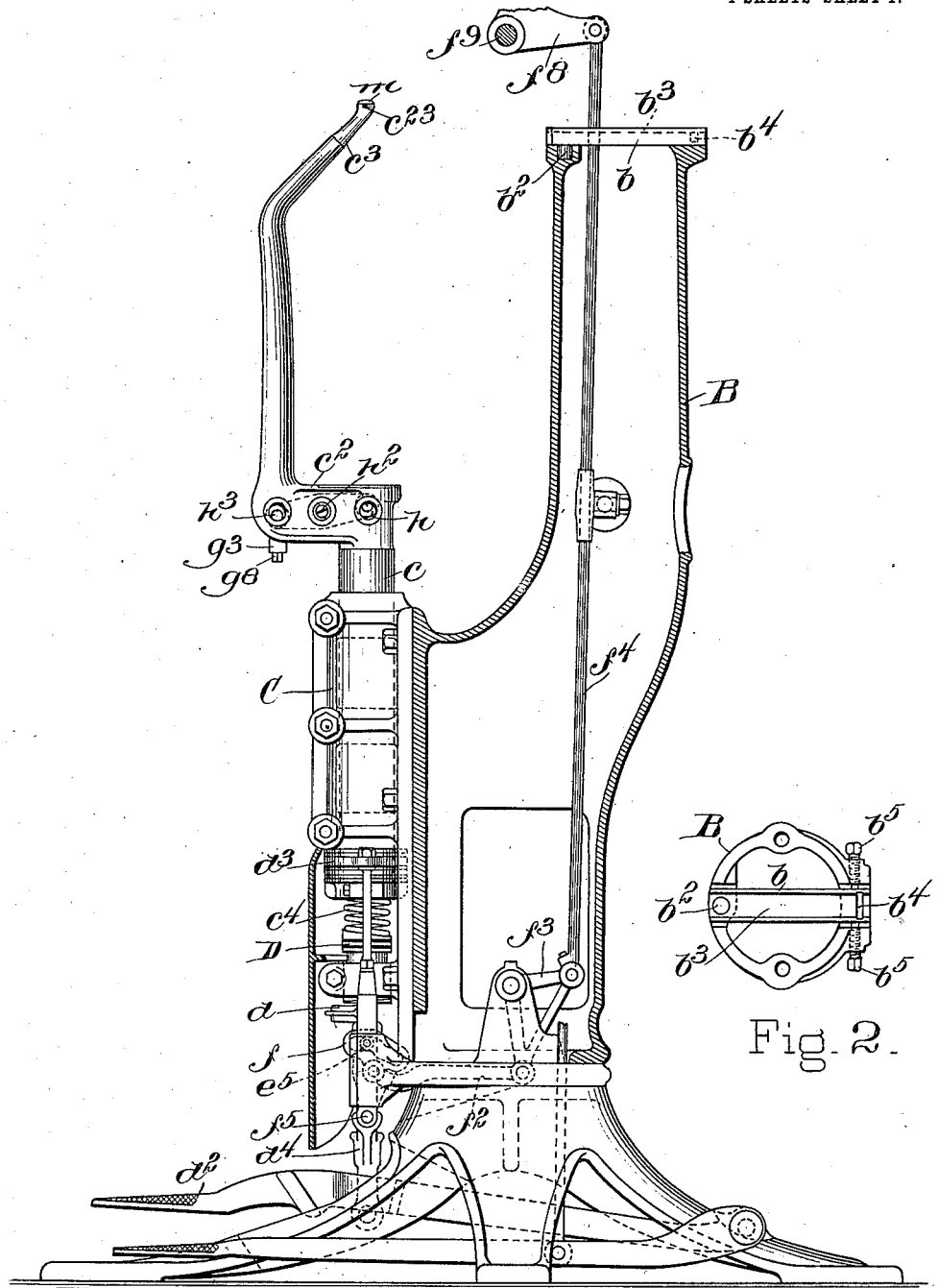

R. F. McFEELY.
PEGGING MACHINE.
APPLICATION FILED MAR. 24, 1900. RENEWED FEB. 1, 1912.

1,028,240.

Patented June 4, 1912.

4 SHEETS—SHEET 1.

WITNESSES:
Jas. F. Maloney.
Nancy P. Ford.

INVENTOR
Ronald F. McFeely
by J. P. and H. Livermore
att'ys

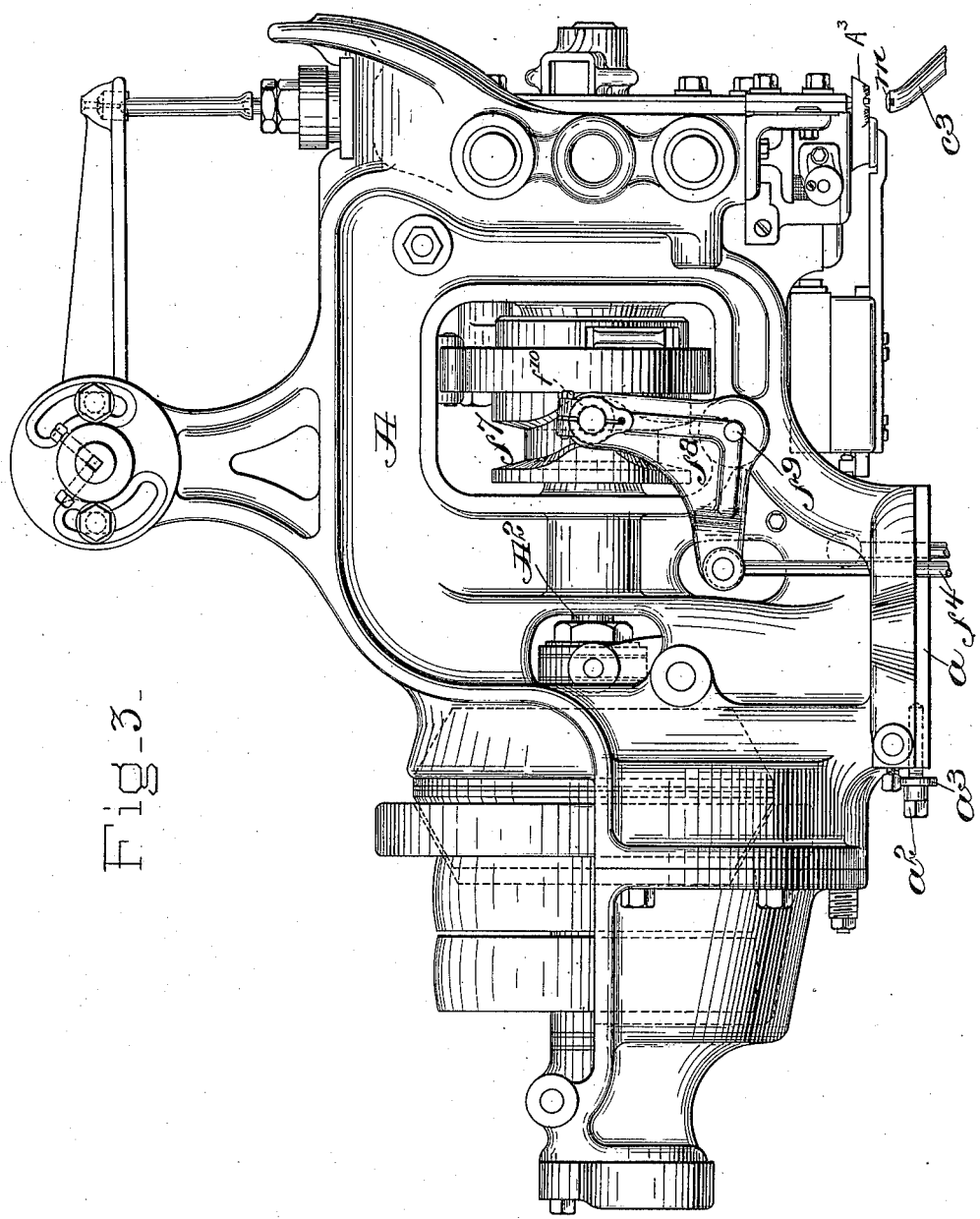

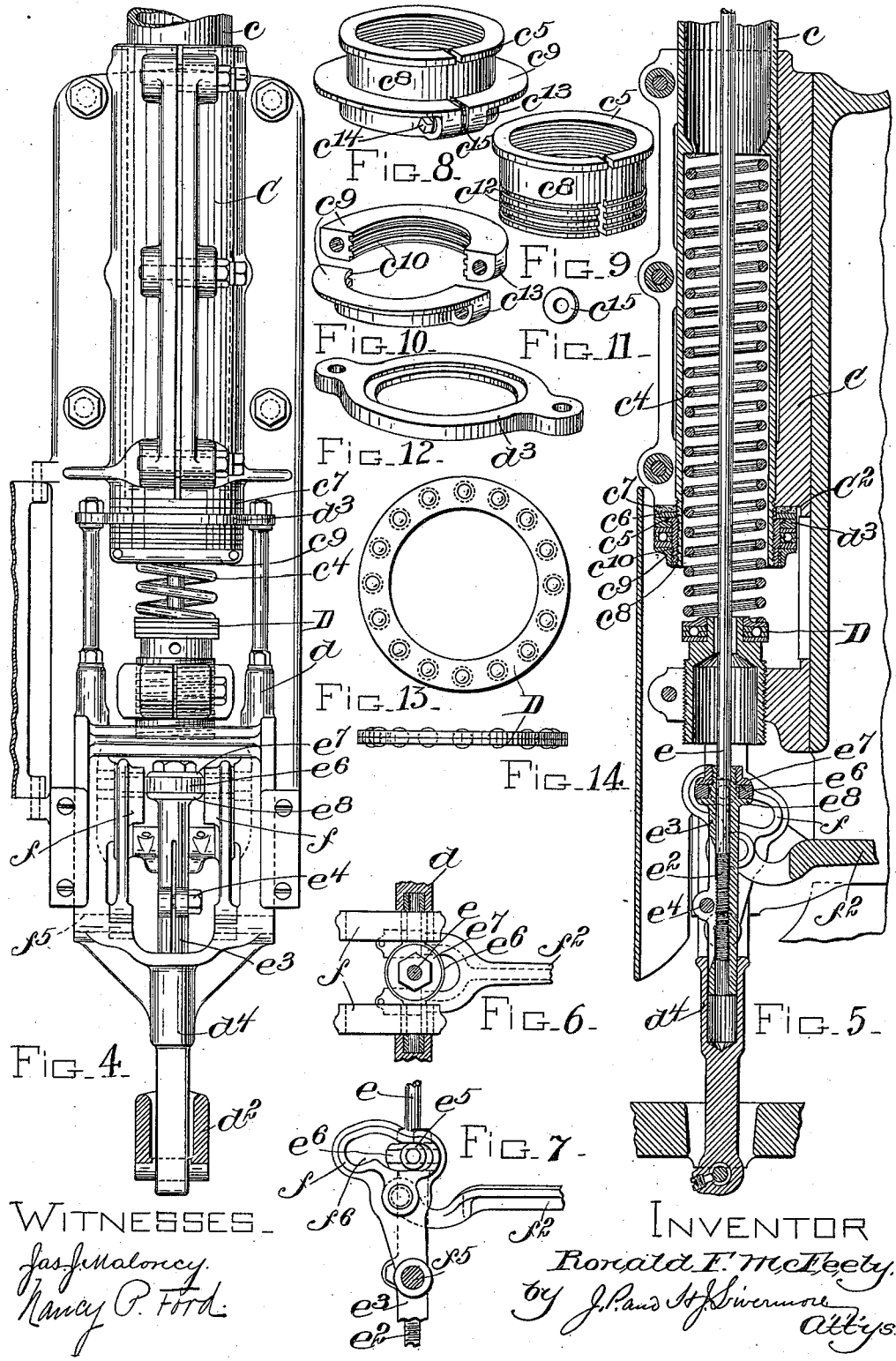

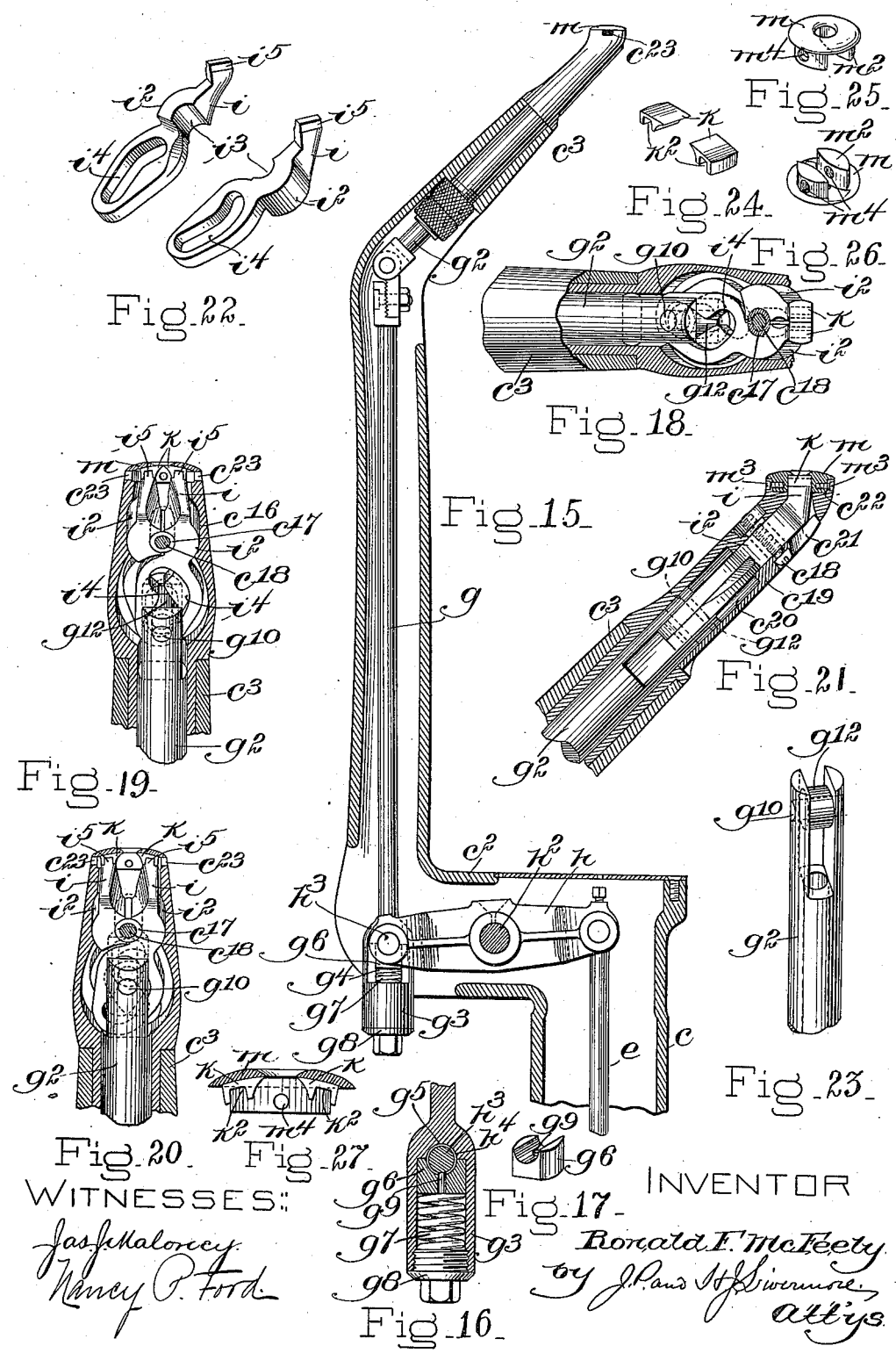

UNITED STATES PATENT OFFICE.

RONALD FRANCIS McFEELY, OF BEVERLY, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

PEGGING-MACHINE.

1,028,240.     Specification of Letters Patent.     Patented June 4, 1912.

Application filed March 24, 1900, Serial No. 10,020. Renewed February 1, 1912. Serial No. 674,828.

*To all whom it may concern:*

Be it known that I, RONALD F. MCFEELY, of Beverly, county of Essex, and State of Massachusetts, have invented an Improvement in Pegging-Machines, of which the following description, in connection with the accompanying drawings, is a specification, like letters on the drawings representing like parts.

This invention relates to a pegging machine for pegging boots and shoes, and is shown as embodied in a machine for pegging on a horn after the last is drawn from the boot or shoe to be pegged, although portions of the invention are applicable to machines for pegging a boot or shoe while on the last.

The invention consists in improvements herein shown as embodied in or applied to a machine of the kind described and illustrated in Patent No. 581,066, granted April 20, 1897 to John F. Davey and Sherman W. Ladd, it being obvious, however, that the invention or parts thereof may be applicable to other machines.

The invention relates mainly to those parts of the machine which include the horn or work support, the peg trimming or cutting devices and the operating mechanism for the said parts.

Figure 1 is a vertical section of the supporting column of a machine embodying the invention, the horn and horn support being shown in elevation; Fig. 2 is a detail in plan showing the means for adjusting the head with relation to said column and the horn supported thereby; Fig. 3 is a side elevation of the head of the machine looking toward the right; Fig. 4 is a front elevation on a somewhat larger scale of the horn support and the mechanism below the horn; Fig. 5 is a vertical section on a plane transverse to that of Fig. 4; Figs. 6 and 7 are details of the cutter rod actuating mechanism in plan and elevation respectively; Figs. 8, 9, 10, 11 and 12 are details showing the several parts of the horn adjusting devices; Figs. 13 and 14 are details showing an antifriction device; Fig. 15 is a vertical section of the upper part of the horn showing in elevation the cutter actuating rods and connections; Fig. 16 is a sectional detail on an enlarged scale of the yielding connecting device in the cutter rod to prevent damage if the awl or any substance which cannot be cut (such as a lasting tack for example) should enter between the cutters; Fig. 17 is a detail in perspective showing part of the same device; Fig. 18 is an enlarged sectional plan view of the horn top and cutters and a portion of the cutter actuating mechanism; Fig. 19 is a sectional elevation thereof, showing the cutters in their closed position; Fig. 20 is a similar view showing the cutters in their open position; Fig. 21 is a longitudinal section of the horn top showing the cutter actuating mechanism in elevation; Fig. 22 is a perspective view of the cutter jaws; Fig. 23 is a perspective view of the upper end of the rod which directly actuates the cutter jaws; Fig. 24 is a perspective view of the cutters detached; Fig. 25 is a perspective view of the horn top or cover; Fig. 26 is a perspective view of the same inverted; and Fig. 27 is a vertical section of the said cover, showing the cutters in elevation, said Fig. 27 being drawn to a larger scale than that of Figs. 25 and 26.

The main frame work A or head of the machine which contains the awl and driver and the actuating mechanism therefor (the said parts as herein shown being substantially like those illustrated in the Davey and Ladd patent above referred to) is supported directly upon the column B to which is also secured the horn supporting sleeve C, the said parts being so arranged that the axis of rotation of the horn and consequently the position of the horn top in the horizontal plane is fixed with relation to the said column. In order, therefore, to properly adjust the head with relation to the top or work supporting end of the horn so that the awl and driving mechanism may be brought to the right position with relation to said top, the said column is shown as provided at the top with a transverse supporting member *b* (Figs. 1 and 2) pivotally connected therewith at $b^2$ and having a channel $b^3$ adapted to receive a tenon or projection $a$ (see Fig. 3) along the under surface of that part of the head A which rests upon the said column. To provide for the longitudinal adjustment of the head toward and from the horn top the member $b$ is also provided with a transverse channel $b^4$ adapted to receive a flange $a^3$ upon an adjusting screw $a^2$ coöperating with a threaded socket in the head A. By turning the said screw, therefore, which is thus held longitudinally stationary with relation to the member $b$, the said head may be moved toward or from the horn until it reaches the proper position with relation thereto. To provide for a lateral or angular adjustment of the head, the said member $b$ is engaged at each side of its free end by adjusting screws $b^5$, working in suitable threaded holes in the column B, it being obvious that by turning said screws the said member $b$ may be swung on its pivotal support $b^2$ and locked after the head is properly adjusted.

The horn which comprises the shank portion $c$, the offset portion $c^2$ and the horn proper $c^3$ is rotatably mounted in the horn supporting sleeve C secured to the front portion of the frame, as shown in Fig. 1. The said horn contains a cutting device for the ends of the pegs which device will be hereinafter described, and the said cutting device is operated by a reciprocating rod $e$, Fig. 6, extending upward through the horn shank and arranged to be reciprocated in the operation of the machine by means of an actuator or, preferably, a pair of actuators $f$, as shown. To transmit the movement of the rod $e$ across the offset portion $c^2$ of the horn and to the cutting device in the horn, said actuating rod $e$ is connected with supplemental rods $g$, $g^2$ extending upward through the horn proper, as best shown in Fig. 15, the movement of the rod $e$ being transmitted to the rod $g$ by means of a suitable transmitting device herein shown as a lever $h$ pivoted at $h^2$. The rods $g$, $g^2$ which are thus reciprocated, cause the operation of the cutting device which is herein shown as a pair of cutter jaws $i$ provided with cutters $k$ to sever the end of the peg which projects, after being driven, into the horn. The said cutting device is shown in Figs. 18 to 27 inclusive, and will hereinafter be described in detail.

In order that the shoe to be pegged may be placed upon the horn it is necessary that the said horn should be depressed prior to the operation, and to this end the said horn, which is shown as supported and yieldingly pressed upward by a spring $c^4$ is provided with a depressing device consisting of a yoke or frame $d$ sliding in vertical guideways and provided with a treadle lever $d^2$, the normal position of the said horn (when no work is in the machine) being determined by a shoulder $C^2$ at the lower portion of the horn supporting sleeve, the horn itself being provided with a corresponding annular shoulder or flange which is normally pressed upward against the shoulder $C^2$ by the action of the spring $c^4$, the construction and arrangement of which is the same as has been heretofore used.

In the operation of the machine the material is pressed upward by the horn, upon which it is supported, against the stationary nose-plate $A^3$, the operation of the peg driving mechanism and feeding mechanism depending upon the yielding upward pressure of the horn as explained in the Davey and Ladd patent hereinbefore referred to. It is obvious, therefore, that the vertical position of the horn will vary according to the thickness of the material being operated upon, and it is essential that such variation should not affect the proper operation of the cutting device. Since the operation of the said cutting device depends upon the reciprocation of the rod $e$, it is necessary that there should be no independent vertical movement of said rod relative to the horn other than that which is caused by the mechanism which actuates the said rod. In other words, it is necessary that the position of the said rod at each end of its movement should always be constant with relation to the position of the horn, so that the cutting device may be unaffected by the vertical movements of the horn.

In the machine shown in the Davey and Ladd patent before referred to provision was made for actuating the peg cutting device unaffected by the vertical movement of the horn, a portion of the cutter actuating mechanism having its bearing upon the horn depressing yoke or frame which in the construction shown in said patent might have the same vertical movement as the horn. In the construction shown in said patent, however, the horn depressing yoke is not positively engaged with the horn, the connection or engagement being such that while the depressor can not move downward independently of the horn, nor the horn move upward independently of the depressor, it is possible for the horn to be moved downward independently of the depressor, there being only the force of gravity to cause the downward movement of the depressor when the horn itself is depressed. With this construction, while the cutters are normally, or as a general thing, unaffected by the vertical movement of the horn, there are occasions when the horn is depressed in the feed movement of the machine or otherwise, and the depressor does not partake fully of the downward movement of the horn, this causing a partial closing movement of the cutters to take place, usually about at the moment when the awl is penetrating the material and thus liable to collide with the cutters unless in their fully open position. Thus considerable trouble was occasionally experienced in the use of the machine, the occasion for which was for a long time undiscovered, as in the normal operation and especially in the slow operation of the machine in which the movements of the parts can be readily observed there is nothing to occasion any opening or closing movement of the cutters by reason of vertical movement of the horn.

In accordance with the present invention the above described difficulty is obviated by providing a connection between the horn and the horn depressing yoke such that neither is capable of vertical movement either up or down with relation to or independent of the other.

As herein shown, the horn depressing device is provided with a channeled ring $d^3$, the channel of which receives a projecting flange $c^5$ from the horn, the said ring and flange being surmounted by a steel washer $c^6$ and a felt washer $c^7$ constituting the shoulder or annular flange which bears against the shoulder $C^2$ when the horn is in its normal position. The horn is thus free to rotate with relation to the depressing device, but is held longitudinally stationary with relation thereto; and the actuators $f$ for the rod $e$ are also connected with the depressing device, which thereby constitutes a connecting member for said parts, so that if the horn is moved downward accidentally or otherwise against the stress of its supporting spring the cutter rod and its actuators will move with it, and the lever $h$ will not be rocked upon its pivot and the cutters will not be moved from their initial position, in response to such movement of the horn.

It is desirable to provide for adjustment of the normal height of the horn (i. e. the position of the horn relative to the overlying nose-plate $A^3$ when no work is in the machine) in accordance with the nature of the work in hand, it being desirable that the horn should stand in a lower position with relation to the nose if the work in hand is thick or heavy than it should if the work to be done is thin or light. In accordance with the present invention provision is made for adjusting the height of the horn with relation to the stop shoulder $C^2$ that limits its upward movement toward the nose-plate $A^3$ when no work is in the machine, as follows, this position of the mechanism being best shown in Figs. 5 to 11, inclusive: The flange $c^5$ which coöperates with the ring $d^3$ is formed upon a split collar $c^8$ having an internal screw thread coöperating with an external screw thread formed on the horn shank $c$ so that by turning the horn shank with relation to said collar its initial position can be varied with relation to the rest of the machine, since the normal position of the said collar will always be determined by the shoulder $C^2$. To lock the horn after the adjustment is effected, the collar $c^8$ is provided with a locking ring $c^9$ provided with annular tongues $c^{10}$ adapted to enter grooves $c^{12}$ upon the outer surface of the said collar, so that a firm frictional fit is afforded between the said parts, the said ring being made in two parts provided with lugs $c^{13}$ adapted to be drawn together by means of bolts $c^{14}$. To adjust the horn, therefore, it is necessary only to loosen the said ring so that the screw threaded parts are free to turn and then to turn the horn with relation to the adjusting collar $c^8$ until the proper position has been reached, after which the parts may be locked. Since the collar $c^8$ is surrounded by the other parts so as to be inaccessible, it is difficult to determine whether it has turned with the horn or remained stationary, as is necessary for adjustment, unless the ring $c^9$ is entirely removed. To obviate the necessity of removing the ring $c^9$ however, the said ring is provided in accordance with the present invention with a retaining device which prevents the rotation of the collar $c^8$ with relation to said ring, the said retaining device being herein shown as a projection $c^{15}$ extending from the ring $c^9$ laterally into the slot in the collar $c^8$, the said projection being conveniently made in the form of a washer held in place by one of the bolts $c^{14}$ which clamp the said ring. With this construction it is necessary only to loosen the ring without removing the same, and to then hold the said ring stationary as the horn is turned, the collar being prevented from movement with the horn by the said locking projection which connects it with the ring.

In order to prevent any operating movement of the cutting device while the horn is being adjusted, it is essential that the cutter rod $e$ should have a vertical adjustment with relation to its actuating devices equivalent to the vertical adjustment of the horn itself. In accordance with the present invention the adjustment of the cutter rod may be made simultaneously with that of the horn, the said cutter rod being shown as provided at its lower end with a screw thread $e^2$ coöperating with an internal screw thread in a split sleeve $e^3$, the actuating devices $f$ coöperating directly with the said sleeve instead of with the rod itself, so that the rod can be adjusted by turning it in the said sleeve with relation to its actuating devices to correspond to the adjustment of the horn. The said sleeve is shown as arranged to be clamped by means of a bolt or screw $e^4$, it being necessary only to loosen the said bolt when the horn is adjusted, since the rod obviously turns with the horn and will properly coöperate with the screw thread in the sleeve $e^3$. To steady the lower end of the rod the depressing device is shown as provided with a socket $d^4$ into which the lower end of the sleeve $e^3$ projects.

The actuating devices $f$ for the cutter rod have a reciprocating movement when in operation, but must obviously be bodily carried with the horn and cutter in the vertical movement of said horn. The reciprocating movement of the actuating devices is afforded through the agency of a link $f^2$ pivotally connected with the end of an elbow lever $f^3$, one arm of which is secured to a reciprocating rod $f^4$ (Fig. 1). When the horn is depressed, therefore, it is obvious that a slight movement of the actuating devices with relation to the rod will take place owing to the fact that the point of connection between the said actuating devices and the link moves on the arc of a circle, while the pivotal support of the actuating devices moves in a straight line. It is desirable, therefore, that the said actuating devices should be so arranged that the movement thus produced will have no effect upon the cutter rod $e$, that is to say, will produce no movement thereof with relation to the horn, so that the cutters will remain in their normal position except when the actuators are given their normal movement in the operation of the machine. For this purpose the said actuators in accordance with the present invention comprise oscillating members pivoted at $f^5$ in the horn depressing yoke $d$, and having cam grooves $f^6$ coöperating with cam rolls $e^5$ (Fig. 7) suitably connected with the sleeve $e^3$ which carries the cutter rod $e$. The said cam grooves for some distance from each end are curved on the arc of a circle struck from the axis of oscillation of the said actuating devices, the length of the parts thus curved being sufficient to take up all movement of the actuators caused by the depression of the horn. This constitutes a lost-motion connection between the cutting and the actuating devices, since any movement of the oscillating members which is so slight as not to cause the cam rolls to leave the arcs in said members will have no effect on the cutter rod. When, therefore, in the operation of the machine the horn is depressed to varying positions owing to variations in thickness in different parts of the sole of the shoe which is being operated upon or otherwise, the movement of the cutter actuators caused thereby will not produce any operative movement of the cutters themselves, so that when the machine starts the cutters will start from their normal open position and finish at their normal closed position, there being no preliminary movement which might result in their coming together too forcibly and breaking or failing to come fully together when the actuating devices perform their normal operation. By this construction the position for the opening and closing movement of the cutters is absolutely unaffected by the vertical movement of the horn and thus rendered more efficient than in the machine of the Davey and Ladd patent above referred to, in which, although the position of the cutters was substantially unaffected by the change of angle of the substantially horizontal connecting link from the mechanism on the frame of the machine to that on the horn, there was under some circumstances a sufficient variation to produce an appreciable difference in the pressure of the cutting edges toward one another and thereby affect their efficiency in cleanly cutting the peg ends.

In order that the cutter rod may rotate freely with the horn in the operation of the machine, the cam rolls $e^5$ are provided with bearings projecting laterally from a ring $e^6$ inclosed between flanges $e^7$ and $e^8$ on the sleeve, the said flanges thus forming a channel for the ring, so that the sleeve is free to rotate with relation thereto but not free to move longitudinally. The upper flange is shown as formed on a nut screw-threaded on the end of the sleeve $e^3$ for convenience in assembling.

The horn and spring are shown as provided with anti-friction devices D, Figs. 13 and 14, to receive the pressure of said spring substantially as in prior constructions.

As herein shown, the actuators $f$ and the cam rolls $e^5$ are duplicated, there being one at each side of the sleeve $e^3$, and the link $f^2$ is forked as shown, each member of the fork having a pivotal connection with one of the actuators, the fork members straddling the sleeve and rod. The rod $f^4$ which actuates said link through the elbow lever $f^3$ receives a reciprocating movement from a cam $f^7$ on the driving shaft $A^2$ (see Fig. 3), the movement being transmitted to the said rod by means of an elbow lever $f^8$ at the end of a rock-shaft $f^9$ which has a suitable bearing in the head of the machine. One end of the said elbow lever is connected with the rod $f^4$, while the other end is provided with a cam roll $f^{10}$ coöperating with the cam surface $f^7$, both ends of said elbow lever being substantially in the same plane. By this construction the relation between the cam roll and the point of connection between the elbow lever and the rod $f^4$ is not substantially affected by lost motion due to wear in the bearing for the rock-shaft, and the cutters will continue to receive their full operating movement even after the bearing for the rock-shaft is worn somewhat loose. In the construction heretofore employed the arm bearing the cam roll was secured to one end of the rock-shaft, while the arm connected with the rod $f^4$ was secured to the opposite end of the said shaft, so that, in the action of the cam a strain was brought to bear upon the rock shaft tending to loosen the same in the bearings, permitting the same to move out of line, such movement altering the relation between the ends of the two arms, so that the cutters after the machine had been in use only a short time would fail to come wholly together, causing failure to properly cut the pegs. This was found to necessitate frequent renewal of the bearing bushings for the rock-shaft, which difficulty is substantially obviated by the present construction.

It frequently happens in the operation of the machine that the awl breaks in the material and is left projecting into the space between the cutters instead of being pulled out and replaced by the peg prior to the operation of the said cutters. Other substances which cannot be severed (for example a lasting tack) may also happen to get into the space between the cutters in the operation of the device, and in machines as heretofore constructed such accidents have resulted in the breaking of the cutters or some part of their actuating mechanism, since there was nothing to prevent the cutters from being forced together with a positive movement which could not result otherwise. To obviate this difficulty and prevent breakage of the cutter actuating mechanism and, so far as possible, damage to the cutters due to such abnormal circumstances, the cutter actuating mechanism is arranged to include a yielding part interposed between the actuators for the cutter rod and the actuators for the cutter jaws, a spring being most conveniently employed, the stress of the spring being sufficient to overcome the resistance of the peg to the cutters but not sufficient to overcome the resistance of material too hard to be severed thereby. In the construction shown the said spring or yielding part is interposed between the rod $g$ and the lever $h$ which extends across the offset portion $c^2$ of the horn.

As best shown in Figs. 15 and 16, the rod $g$ is provided at its lower end with a socket-piece $g^3$ provided with openings $g^4$ which are shown as formed by cutting away the sides of the socket-piece along the upper portion thereof for a distance which should be at least equal to the length of movement of the end of the lever $h$. The said lever $h$ is forked and provided with a transverse pin $h^3$ extending through the said opening in the socket, the upper side of the said pin bearing against a transverse groove $g^5$ formed in the said socket and the lower side of said pin bearing in a similar groove formed in a block $g^6$ which has a working fit in the said socket. Below the said block $g^6$ is a stiff spring $g^7$, the stress of which is sufficient to overcome the resistance of the material to be cut, the said spring being shown as held in position by means of a screw plug $g^8$ inserted in the end of the socket. As the rod $e$ moves upward, therefore, the pin $h^3$ will bear down upon the block $g^6$ and the downward movement will be transmitted through the spring $g^7$ and plug $g^8$ to the rod $g$, thus causing the cutting operation, but in case the cutters are actually stopped in their closing movement the spring $g^7$ will yield and thus prevent damage to the working parts of the machine. As a convenient means for holding the pin $h^3$ in position, the said pin is provided with a groove or channel $h^4$ and the block $g^6$ has a projection $g^9$ which may consist as shown, of a pin driven into a bore in the said block, the said pin projecting into the groove $h^4$ and preventing the pin $h^3$ from coming out endwise. In assembling the device the pin $h^3$ is first inserted in the openings at the end of the lever $h$ and the block $g^6$ and spring $g^7$ are then inserted in the socket piece and secured in position by the screw plug $g^8$.

The cutter jaws $i$ are arranged, in accordance with the present invention, to have a positive movement in each direction, the said jaws being pivoted in such a manner as to have the action of an ordinary pair of pliers so as to bring together and separate the cutting blades or knives $k$ which are carried at the ends of the said jaws. To support the jaws the upper portion of the horn is provided with bearing recesses $c^{16}$ adapted to fit and support outer convex bearing portions $i^2$ formed on the jaws $i$, the said jaws being inserted in the horn and given a bearing therein by means of a transverse pin $c^{17}$ which fits the inner concave bearing portions $i^3$ of the jaws, the said pin being held in position by means of a screw $c^{18}$. The positive movement of the said jaws in each direction upon the pivotal support thus afforded is provided for by means of cam grooves $i^4$ formed in the shanks of the jaws, the said grooves being oppositely disposed as shown, and the said shanks so arranged as to overlap each other when the jaws are in place. The supplemental rod $g^2$ which is pivotally connected with the rod $g$ at the bend in the horn is forked at the end as shown in Fig. 23, and provided with a transverse pin $g^{10}$ and cam roll $g^{12}$, the said roll when the parts are in position extending through the grooves $i^4$ in the jaws $i$, the shanks of the jaws lying between the forked ends of the rod $g^2$, as best shown in Figs. 18, 19, 20, and 21. The reciprocating movement of the said rod $g^2$ will, therefore, produce the oscillating or swinging movement of the jaws to bring together and separate the cutter blades $k$ carried thereby, and such movement will obviously be a positive movement in each direction.

The upper portion of the horn is shown as open along the under side and provided with a removable plate $c^{19}$ having a channel $c^{20}$ to guide the actuating rod $g^2$, the said plate being held in position by means of the screw $c^{18}$, which supports the inner bearing $c^{17}$ for the cutter jaws. The said plate is provided at its upper end with an opening $c^{21}$ which is directly below the opening in the top, to permit the ends of the pegs to drop out as fast as they are cut, so that the said peg ends and other foreign substances will not collect within the horn and clog the cutter jaws.

The cutters $k$ in accordance with the invention are provided with transverse channels $k^2$ along their under sides, the said channels being adapted to fit and be retained upon tongues $i^5$ at the ends of the jaws $i$, there being no fastening devices necessary, since the said cutters are held in position by the horn top or cover $m$, the under surface of which is curved, as best shown in Fig. 27, to conform to the movement of the said cutters. To remove or replace the cutters, therefore, it is necessary only to remove the cover $m$, taking out the cutters and replacing them by new ones. As the cutters owing to their constant and severe use wear out quickly and have to be replaced frequently where the machine is in constant use; it will be seen that this provision for convenient removal and replacing of the cutters is an important feature of this invention. Furthermore, the tongues $i^5$ afford a wide bearing surface as nearly as possible in line with the edges of the cutters and are not subject to wear to any great extent so that while the cutters may be frequently renewed, the cutter jaws will last for a comparatively long time. In other words, there are no fastening devices to connect the cutters with the cutter jaws which are liable to wear out quickly so as to require not only a renewal of the cutters themselves but of the cutter jaws as well.

As heretofore constructed, the top or cover has been secured to the end of the horn by screws extending through the surface of the cover into the end of the horn. Such a construction is objectionable for the reason that the material, during the feed movement, is pressed firmly against the surface of the cover and the unevenness due to the screw holes is liable to injure the material as it is fed along, besides offering resistance to the feed movement. Furthermore in the rotation of the horn, the screw heads come frequently into the line of feed and the awl is liable to catch in the screw slots or the openings for the screws and thus become dulled or broken. Furthermore, the screws become worn and damaged so that it is difficult to remove them, especially in view of the fact that they are not readily accessible, since the top is directly under the nose-plate. It is therefore extremely desirable to obtain a smooth and uniform work supporting surface, and at the same time to render the top easily and quickly removable; and to these ends the said top, in accordance with the invention, is provided with fastening devices below the surface, which surface is thus left uniformly smooth, and said fastening devices may be so arranged as to be accessible from the side of the horn, where there is nothing to interfere with a screw driver or other tool by which they are adapted to be manipulated. As herein shown, the top is provided with a downwardly projecting tongue $m^2$ adapted to fit a socket afforded by an annular flange $c^{22}$ at the upper part of the horn, the surface of the top overlying the edge of the flange, while the socket affords a firm lateral support for the top which is further held in place by means of suitable fastening devices such as screws $m^3$, as best shown in Fig. 21. The said screws are shown as coöperating with lateral threaded openings $m^4$ at opposite sides of the tongue, the heads of the screws thus being easy to get at.

As has been stated, the cover or top is arranged to keep the cutters in place upon the cutter jaws without fastening devices, and to this end the tongue $m^2$ is provided with a transverse channel for the said cutters, the under surface of the cover between the two parts of the tongue being shaped to conform to the path of movement of the cutters, as indicated in Fig. 27, and so arranged that the distance between the said surface and the ends of the cutter jaws or tongues $i^5$ is substantially equal to the thickness of the cutters where the channels are formed therein, so that the cutters are snugly held in position throughout their movement.

The supporting flange $c^{22}$ is shown as provided with openings $c^{23}$ in line with the channel in the cover, the said openings permitting foreign substances to work out, and also being large enough to permit the back part of the cutter to be thrown out if the said cutter breaks along the channel $k^2$ where the break usually ocurs, if at all, this being the weakest part. This is of considerable importance, since the back end of a cutter thus broken would otherwise drop between the outer portion of the jaw and the interior of the horn, and would be jammed in at the next opening movemnt of the jaws, thus damaging not only the jaws but the inner surface of the horn. There is room enough between the inner sides of the jaws for the front part of the cutter which will drop there naturally, and in practice it is found that if the cutter breaks, the back part will be kicked out through the opening in the flange in response to the opening movement of the jaws, while the front or edge portion of the cutter has room enough to lie in the space between the inner portion of the jaws without coming in contact therewith as they close, so that there is no danger of any damage before the breakage is discovered.

Since the supporting plane of the horn is substantially horizontal, while the axis of the cutter jaws is at an angle thereto, it is obvious that the cutters, as the jaws open and close, will travel along a curved line in the plane of the cover, and in order to accommodate such movement the transverse channel in the tongue is provided with curved walls, as best shown in Fig. 26. For convenience the walls of the slot may be curved in opposite directions, so that the cover can be placed in position either side to, it being immaterial whether or not the cutter blades $k$ are laterally confined throughout their movement or not, since at no point is the slot wide enough to permit the said blades to slide off the tongues $i^5$, while they will be brought together and centered in any event at the middle of the cover where the distance between the walls of the slot is substantially equal to the width of the blades. Furthermore, by widening the slot at each end, the back part of a broken cutter has plenty of room, and will be more readily thrown out through the opening $c^{23}$ than would be the case if it snugly fitted the channel.

Having thus described in detail one embodiment of my invention, what I claim as new and desire to secure by Letters Patent of the United States is:

1. In a pegging machine, the combination with a vertically movable horn; of a cutting device operating in the top of said horn; a rod to actuate said cutting device; an actuator for said rod vertically movable with said horn and laterally movable with relation thereto to produce the independent vertical movement of said rod; a pivotally supported link coöperating with said actuator; and means for preventing the movement of said actuator caused by a downward movement of the horn relative to said link from causing any movement of the rod independent of the horn.

2. In a pegging machine, the combination with a rotatable and vertically movable horn; of a spring to force said horn to its operative position; a cutting device operating in the top of said horn; a rod to actuate said cutting device, rotatable with said horn, but longitudinally movable with relation thereto; an actuator for said rod vertically movable with said horn and laterally movable with relation thereto to produce the independent movement of the rod to actuate the cutters; means located independently of the horn to produce such lateral movement of the actuator regardless of the vertical position of the horn; and means for preventing the lateral movement of the actuator produced by a slight movement of the horn with relation to the operating device from being imparted to the rod to produce a movement thereof independent of the horn.

3. In a pegging machine, the combination with a vertically movable horn; of a depressing device therefor; a cutting device operating in said horn; an actuating device for said cutting device connected with said depressing device and adapted to operate said cutting device; means for preventing a vertical movement of the horn with relation to the depressing device, said depressing device thus constituting a connecting member to maintain said horn and said actuating device in the same vertical position relative to each other; means located independently of the horn for producing a lateral movement of said actuating device; and means whereby a portion of such lateral movement of the actuating device is prevented from producing a corresponding movement of the cutting device.

4. In a pegging machine, the combination with a vertically movable horn; of a depressing device therefor; a cutting device operating in said horn; an actuator vertically movable with the horn and independently movable to operate said cutting device; and a lost-motion connection between the cutting device and the actuator, whereby during a portion of the independent movement of the actuator the cutting device is not operated.

5. In a pegging machine, the combination with a vertically movable horn; of a cutting device operating in said horn; means for operating the cutting device located independently of the horn; and connections from said means to said cutting device so constructed and arranged that the cutting device is actuated only by said means and is unaffected by vertical movements of the horn.

6. In a pegging machine, the combination with a vertically movable horn; of a depressing device therefor; a cutting device operating in said horn; an actuating device for said cutting device connected with said depressing device and adapted to operate said cutting device; and means having provision for adjustment for preventing vertical movement of the horn with relation to the depressing device, said depressing device thus constituting a connecting member to maintain said horn and said actuating device vertically always in the same position relative to each other and means for producing a lateral movement of said actuating device relative to the horn.

7. In a pegging machine; the combination with a vertically movable horn; of a depressing device therefor; a cutting device operating in said horn; an actuator vertically movable with the horn and provided with a cam groove; devices connecting said cutting device with the cam groove of said actuator; and means for moving the actuator independently of the horn to operate the cutting device.

8. In a pegging machine, the combination with a rotatable horn provided with a supporting spring; of a non-rotatable depressing device whereby the said horn may be depressed against the stress of the said spring; an adjusting device whereby the position of the said horn may be varied with relation to that of the said depressing device; and means for preventing an independent vertical movement of the said horn with relation to said depressing device after the adjustment is effected, as set forth.

9. In a pegging machine, the combination with a rotatable horn and a cutting device operating in the top of said horn; of a vertically movable rod within said horn for operating the said cutting device; a spring support for the said horn and rod; a non-rotatable depressing member for the said horn and rod; the actuators for the said rod connected with said depressing member, the said horn and said actuators being prevented from vertical movement in either direction with relation to said depressing member; and means for vertically adjusting the normal position of said rod and said horn with relation to said depressing member, substantially as described.

10. The combination with the rotatable horn provided with an external screw thread; of an internally threaded flanged collar surrounding the said horn; a non-rotatable ring having an annular channel to receive the flange of the collar; a depressing device connected with said ring; means for limiting the upward movement of the said flanged collar and ring; and a clamp for tightening the said collar after the horn has been adjusted with relation thereto, substantially as described.

11. The combination with the rotatable horn provided with an external screw thread; of an internally threaded flanged collar surrounding the said horn; a non-rotatable ring having an annular channel to receive the flange of the collar; a depressing device connected with said ring; means for limiting the upward movement of the said flanged collar and ring; a clamp for tightening the said collar after the horn has been adjusted with relation thereto; and means for preventing any substantial rotary movement of said collar with relation to said clamp, as set forth.

12. The combination with the rotatable spring supported horn; of a non-rotatable depressing device therefor; the channeled ring $d^3$ connected with said depressing device; the split collar $c^8$ provided with the flange $c^5$ to fit the channel in the ring $d^3$, said collar being screw threaded on the horn; the clamping ring $c^9$; and the locking device $c^{15}$ connected therewith and projecting into the split in the collar $c^8$, as set forth.

13. The combination with the horn; of the cutting device and a rod for operating the same said rod being connected with said horn so as to be turned therewith; a split sleeve threaded on the lower end of the said rod whereby the position of the rod with relation to said sleeve may be adjusted by turning the horn; a clamping device for clamping the said sleeve on the rod after the proper adjustment has been attained; and an actuating device coöperating with said sleeve to produce a reciprocating movement of said rod, as set forth.

14. The combination with a spring supported rotatable horn adapted to be depressed against the stress of its spring; of a non-rotatable depressing member for the said horn; a cutting device and actuating rod therefor movable with the said horn; an adjusting sleeve screw threaded on the said rod and rotatable therewith; a ring surrounding the said sleeve and provided with projections having cam rolls thereon; actuating members provided with cam grooves coöperating with said rolls, the said members being pivotally supported upon the depressing member; and means for oscillating said actuating members, substantially as described.

15. The combination with a depressible horn provided with a cutting device and an actuating rod for said cutting device depressible with said horn; of an actuating device for said rod also depressible with said horn and consisting of an oscillating member; an elbow lever having a fixed pivotal support in the frame of the machine; means for operating said lever; a link connecting said lever with said oscillating member; a cam groove in said oscillating member a portion of which is curved on an arc struck from the axis of oscillation of said member; and an engaging member connected with the said actuating rod and coöperating with said cam groove, substantially as described.

16. In a pegging machine, the combination with a rotatable and vertically movable horn; of a cutting device operating in said horn; an actuating rod for said cutting device longitudinally movable in the horn; an actuator for said rod having a wedge-like action thereon; means for moving the actuator laterally independently of the horn to cause the cutting device to sever pegs; and means for supporting said actuating rod against the lateral stress exerted upon it by the actuator, said supporting means engaging the rod at opposite sides of the point at which said stress is applied.

17. In a pegging machine; the combination of a horn; with a cutting device operating in said horn; an actuating rod for the said cutting device movable with said horn; a non-rotatable horn-depressing member provded with a bearing socket for the end of said actuating rod to afford a lateral support therefor; and a laterally-movable actuating device for said rod, substantially as described.

18. In a pegging machine, the combination of a horn; with a cutting device operating in said horn; an actuating rod for said cutting device longitudinally movable in the horn; a horn depressing member provided with a bearing-socket for the end of said rod to afford a lateral support therefor; guide-bearings to compel the horn and the depressing member to move in the same or parallel lines, and a laterally movable actuating device for said rod.

19. In a pegging machine, a horn or work support; a reciprocating cutting device operating in said horn; means for actuating said cutting device; and mechanism yieldingly connecting said cutting device with said actuating means arranged to permit relative movement between them at any time during the operation of the cutting device.

20. The combination with the horn or work support; of a cutting device operating in the top thereof; a reciprocating rod located in the horn for actuating the said cutting device, the said rod being formed in two sections; a yielding connecting device also located in the horn and interposed between the said sections to permit the movement of one part of the said rod with relation to the other if abnormal resistance is opposed to the action of the cutting device, and means for reciprocating said rod, substantially as described.

21. The combination with the horn provided with an offset portion; of the cutting device; the main operating rod therefor provided with an actuating device for producing the reciprocating movement thereof; a lever pivoted in the said offset portion of the horn and connected at one end with said rod; a supplemental rod arranged to directly operate the cutting device and to be reciprocated in response to the movement of said lever; and a spring interposed between said lever and said rod, substantially as and for the purpose described.

22. The herein described horn top or cover having a uniformly smooth annular supporting surface; and a tongue below said surface provided with lateral openings and a channel through the middle, as set forth.

23. The herein described horn top or cover having a uniformly smooth annular supporting surface; a tongue below said surface provided with lateral openings; and a channel through the middle of said tongue, the opposite walls of said channel being convex, as set forth.

24. In a pegging machine, the combination with the horn provided with an annular vertical flange; of a horn top or cover having a central perforation for the awl and a tongue adapted to fit within said annular flange, said tongue being provided with a channel through the middle, and fastening devices extending laterally through the said annular flange into the said tongue at opposite sides of said channel, as set forth.

25. In a pegging machine, the combination with the horn provided with an annular vertical flange; of a horn top or cover having a central perforation for the awl and a channeled tongue adapted to fit within said annular flange; and openings in said flange in line with the channel in said tongue, as set forth.

26. The combination with the horn; of cutter jaws pivotally supported therein and provided at their ends with transverse tongues; cutters having transverse grooves to fit said tongues; a horn top or cover to afford the work supporting surface the plane of which surface is at an angle to the axis of the cutter jaws; and a channel in the under surface of said top to laterally guide and support said cutters, the opposite walls of said channel being convex and the distance between them at the middle of the horn top being substantially equal to the width of the cutters.

27. The combination with the horn; of the cutter jaws pivotally supported transversely of the said horn; cutters mounted on the tops of said cutter jaws; a horn top or cover connected with said horn to afford the work supporting surface, the plane of the said work supporting surface being at an angle to the axis of said cutter jaws; a channel in the under surface of the said cover having curved walls converging from the circumference to the middle thereof, the width of the said channel at the middle being substantially equal to the width of the cutters; and an opening or perforation in the said cover over the middle of the said channel, as set forth.

28. The combination with the horn provided with inner concave cylindrical bearing surfaces at opposite sides; of a pair of cutter jaws provided with convex cylindrical bearing surfaces at their outer sides and concave cylindrical bearing surfaces at their inner sides; and a cylindrical bearing member extending transversely through the horn to afford a support for the inner bearing surfaces of the cutter jaws, substantially as described.

In testimony whereof, I have signed my name to this specification in the presence of two subscribing witnesses.

RONALD FRANCIS McFEELY.

Witnesses:
HARRY J. LIVERMORE,
NANCY P. FORD.

Copies of this patent may be obtained for five cents each, by addressing the "Commissioner of Patents, Washington, D. C."